United States Patent
Perez-Mercader et al.

(10) Patent No.: US 10,731,012 B2
(45) Date of Patent: Aug. 4, 2020

(54) ANTI-CLOGGING MICROFLUIDIC MULTICHANNEL DEVICE

(71) Applicant: President and Fellows of Harvard College, Cambridge, MA (US)

(72) Inventors: Juan Perez-Mercader, Cambridge, MA (US); Yuandu Hu, Quincy, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 16/182,009

(22) Filed: Nov. 6, 2018

(65) Prior Publication Data

US 2020/0140628 A1    May 7, 2020

(51) Int. Cl.
    *C08J 3/12*  (2006.01)
    *B01J 13/06*  (2006.01)
    (Continued)

(52) U.S. Cl.
    CPC ............. *C08J 3/126* (2013.01); *B01F 3/0811* (2013.01); *B01F 13/0062* (2013.01);
    (Continued)

(58) Field of Classification Search
    CPC .............. B01F 11/0002; B01F 11/0014; B01F 13/0059–13/0072; B01F 15/0233;
    (Continued)

(56) References Cited

U.S. PATENT DOCUMENTS 9,039,273 B2 * 5/2015 Weitz ..................... A61K 9/113
                                                          366/175.2
9,486,757 B2  11/2016 Romanowsky et al.
(Continued)

FOREIGN PATENT DOCUMENTS

WO   WO-2008121342 A2 *  10/2008  ............. A61K 9/113
WO   WO-2015160919 A1     10/2015
WO   WO-2016085739 A1 *   6/2016   ............. B01F 5/045

OTHER PUBLICATIONS

Nisisako, Takasi, et al., "Microfluidic large-scale integration on a chip for mass production of monodisperse droplets and particles", Lab Chip, 8(2), (Nov. 23, 2007), 287-93.
(Continued)

*Primary Examiner* — Charles Cooley
(74) *Attorney, Agent, or Firm* — Tristan A. Fulerer; Olive Law Group, PLLC

(57) ABSTRACT

An anti-clogging microfluidic multichannel device comprising a first mixing chamber comprising a first and a second end, wherein the first end comprises at least one inlet connected in fluid communication with the first mixing chamber, and at least one first capillary element comprising a first and a second end, wherein the first end of the at least one first capillary element is connected in fluid communication with the second end of the first mixing chamber, at least one septum located within the at least one first capillary element, which divides the cross section of the at least one first capillary element in a plurality of channels, wherein the at least one first capillary element comprises a reduction of section along its longitudinal axis between a section of the at least one first capillary element and the second end of the at least one first capillary element. It is also described a microfluidics system and a method of production of emulsions using said microfluidics system.

19 Claims, 8 Drawing Sheets

(51) Int. Cl.
*C08J 3/05* (2006.01)
*B01F 13/00* (2006.01)
*B01F 3/08* (2006.01)

(52) U.S. Cl.
CPC ...... *B01F 13/0064* (2013.01); *B01F 13/0069* (2013.01); *B01J 13/06* (2013.01); *C08J 3/05* (2013.01); *B01F 2003/0834* (2013.01); *C08J 2329/04* (2013.01); *C08J 2471/02* (2013.01)

(58) Field of Classification Search
CPC ............... B01F 15/0201; B01F 3/0811; B01F 2003/0834; F04D 17/10; F04F 1/00; B01L 3/50273; B01L 2200/0621; B01L 2400/0442; B01L 2200/0684; B01L 2300/0803; B01L 2400/0409; C08J 3/126; C08J 3/05; C08J 2471/02; C08J 2329/04; B01J 13/06
USPC ................. 366/237, 341, DIG. 1–DIG. 4
See application file for complete search history.

(56) References Cited

U.S. PATENT DOCUMENTS

| | | | |
|---|---|---|---|
| 9,789,451 B2* | 10/2017 | Ripoll | B01F 3/0807 |
| 10,195,571 B2* | 2/2019 | Weitz | B01F 3/0807 |
| 10,316,873 B2* | 6/2019 | Weitz | A61K 9/113 |
| 10,583,440 B2* | 3/2020 | Bharadwaj | B01F 3/0807 |
| 2009/0012187 A1 | 1/2009 | Chu et al. | |
| 2011/0177587 A1 | 7/2011 | Nobile et al. | |
| 2011/0229545 A1* | 9/2011 | Shum | B01F 3/0807 |
| 2014/0220350 A1* | 8/2014 | Kim | B01F 3/0807 |

OTHER PUBLICATIONS

Vian, Antoine, et al., "Scalable production of double emulsion drops with thin shells", Lab Chip, 18 (3), (Jun. 26, 2018), 8 pgs.

Arriaga, L. R., et al., "Scalable single-step microfluidic production of single-core double emulsions with ultra-thin shells", Lab Chip, 2015, 15, (Jul. 8, 2015), 3335-3340.

Utada, A. S., et al., "Monodisperse Double Emulsions Generated from a Microcapillary Device", Science, vol. 308, (Apr. 22, 2005), 537-541.

Ward, Kevin, et al., "Mixing in microfluidic devices and enhancement methods", Micromech Microeng, 25 (9), (Sep. 2015), 56 pgs.

"International Application Serial. No. PCT/US2019/059860, International Search Report dated Jan. 22, 2020", 4 pgs.

"International Application Serial No. PCT/US2019/059860, Written Opinion dated Jan. 22, 2020", 6 pgs.

Dong, Cheng, et al., "A 3D microblade structure for precise and parallel droplet splitting on digital microfluidic chips", Lab on a Chip, vol. 17, No. 5, (Feb. 6, 2017), 896-904.

\* cited by examiner

ANTI-CLOGGING MICROFLUIDIC MULTICHANNEL DEVICE

TECHNICAL FIELD OF THE INVENTION

The present invention belongs to the field of microfluidic devices and, more particularly, to the field of microfluidic devices with multichannel.

BACKGROUND OF THE INVENTION

Microfluidics has been shown to provide a versatile and powerful tool for a large number of applications in many areas of science and technology [Utada A. S. et al., Science, 2005, 38(5721): 534-541]. Most of these applications have remained laboratory-based due to key limitations of this technology associated with the difficulties encountered in the large-scale production of the products it generates. In particular, it is well known that the microchannels in microfluidic devices are easily clogged by external agents such as dust, residues and other contaminants, for example, those emerging from chemical reactions that may be taking place within the device being fabricated.

These two particular aspects limit the further development of microfluidics, with a particular impact on the potential development of microfluidic technology for large scale applications of the products generated using microfluidics. These limitations are encountered in many applications and more precisely in the production of polymersomes by microfluidics, such as in the large scale generation of polymersomes with a fast formation time.

In particular, as standard glass microfluidic devices easily clog up, their large scale production is not efficient, because the throughput of one channel glass microfluidics is very low. Other devices made of different materials, such as PDMS (Polydimethylsiloxane) microfluidics devices have been proposed. For example, Arriaga, L. R. et al. (Lab Chip, 2015, 15, 3335-3340) reported a scalable PDMS-based microfluidic device, built using soft lithography, to enable the continuous production of double emulsions. Vian et al. (Lab Chip, 2018, 18, 1936-1942) reported a PDMS microfluidic device comprising an aspiration device to reduce the thickness of double emulsion shells. However, PDMS devices normally rely on delicate control of both flow and wettability, making robust operation difficult. A microfluidic device comprising a glass chip and a supporting holder for supplying fluids into the inlet holes of the chip was reported by Nisisako T. and Torii T. for large-scale production of monomer droplets and polymeric microspheres (Lab Chip. 2008, 8, 287-293). U.S. Pat. No. 9,486,757 B2 proposes the parallel use of microfluidic systems for improvement in control of size and dispersity of emulsions as well as scalability. WO2015/160919 A1 describes a system based on multiple microfluidic channels intersecting at junctions in order to control the dimensions and compositions of the emulsions.

Despite the above mentioned efforts, there is still a need for a microfluidic device that solves the problem of clogging, especially as it relates to bulk production of polymersomes for industrial applications in fields such as oil and gas, energy and environment, cosmetics industry, drug and pharmacological industry applications, large scale manufacture of active polymersomes and related industries.

BRIEF DESCRIPTION OF THE INVENTION

The present invention provides an alternative solution for the aforementioned problems, by an anti-clogging microfluidic multichannel device, a microfluidics system and a method of production of multiple emulsions.

Thus, in a first inventive aspect, the invention provides an anti-clogging microfluidic multichannel device comprising:
i. a first mixing chamber comprising a first and a second end, wherein the first end comprises at least one inlet connected in fluid communication with the first mixing chamber, wherein the first mixing chamber is configured
   to receive a first solution through the at least one inlet, and
   to mix said first solution with at least a second solution, and
ii. at least one first capillary element comprising
   a) a first and a second end,
      wherein the first end of the at least one first capillary element is connected in fluid communication with the second end of the first mixing chamber, and is configured to receive from the first mixing chamber a mixture resulting from mixing the first solution and the at least second solution, and
   b) at least one septum located within the at least one first capillary element, which divides the cross section of the at least one first capillary element in a plurality of capillary channels,
      wherein the at least one first capillary element comprises a reduction of section along its longitudinal axis between the first end of the at least one first capillary element and the second end of the at least one first capillary element.

The anti-clogging microfluidic multichannel device comprising at least one first capillary element having a plurality of capillary channels drastically reduces the possibility of getting blocked. Therefore, the chance for a microfluidic device to get fully blocked is also highly reduced.

In a second inventive aspect, the invention provides a microfluidics system comprising:
i. an anti-clogging multichannel device according to the first embodiment,
ii. a mixing device comprising
   a) a second mixing chamber comprising a first and a second end, and
   b) at least one second capillary element with a first and a second end, wherein the at least one second capillary element comprises an increase of section along its longitudinal axis between the first end of the at least one second capillary element and the second end of the at least one second capillary element,
      wherein the second end of the at least one first capillary element is connected in fluid communication with the first end of the at least one second capillary element through the second mixing chamber, and
      wherein the second mixing chamber is configured:
         to house at least a third solution,
         to house the second end of the at least one first capillary element and the first end of the at least one second capillary element, and
         to receive the mixture resulting from mixing the first solution and the at least second solution through the second end of the at least one first capillary element.

The authors of the present invention have observed that the microfluidics system of the present invention comprising the anti-clogging multichannel device as defined above presents an increased useful lifetime because it decreases the risk of getting fully blocked. In addition, the production rate of complex soft structures such polymersomes is also increased respect to that of a standard device.

In a third inventive aspect, the invention provides a method of production of multiple emulsions comprising the following steps:
a) providing a microfluidics system according to the second inventive aspect;
b) injecting a first solution through at least one inlet;
c) mixing the first solution with at least a second solution in a first mixing chamber;
d) letting the mixture resulting from step (c) from the first mixing chamber flow to a second mixing chamber through at least one first capillary element;
e) mixing the mixture resulting from step (d) with at least a third solution in the second mixing chamber to produce multiple emulsions; and
f) outputting the multiple emulsions resulting from step (e) by the second end of at least one second capillary element.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Figure 1:
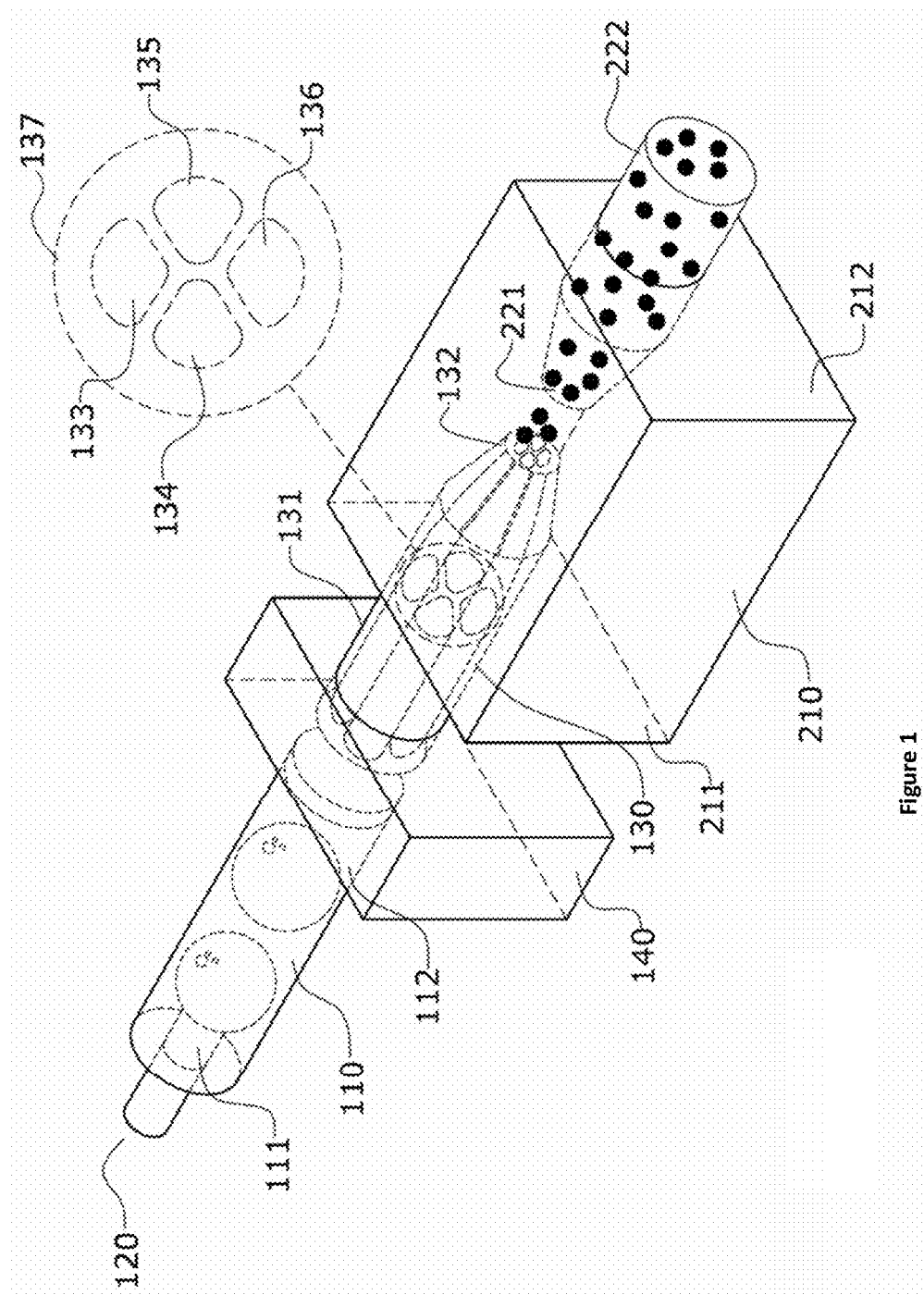
FIG. 1. Isometric representation of an embodiment of the microfluidics system (1).

All the features described in this specification (including the claims, description and drawings) and/or all the steps of the described method can be combined in any combination, with the exception of combinations of such mutually exclusive features and/or steps.

The term "microfluidics" refers to designing, manufacturing and formulating devices and processes that deal with volumes of fluids, normally on the order of nanoliters or microliters. The term "clogging" refers to the mechanisms that interrupt the transport of fluids in microfluidics devices.

Therefore, in the first inventive aspect, the present invention is directed to an anti-clogging microfluidics device to avoid the clogging phenomena and thus, to increase the lifetime and efficiency of microfluidics systems. To this end, the authors of the present invention have developed an anti-clogging microfluidic multichannel device (100) comprising:

i. a first mixing chamber (110) comprising a first (111) and a second (112) end, wherein the first end (111) comprises at least one inlet (120) connected in fluid communication with the first mixing chamber (110),
   wherein the first mixing chamber (110) is configured
      to receive a first solution through the at least one inlet (120), and
      to mix said first solution with at least a second solution, and
ii. at least one first capillary element (130) comprising
   a) a first (131) and a second (132) end,
      wherein the first end (131) of the at least one first capillary element (130) is connected in fluid communication with the second end (112) of the first mixing chamber (110), and is configured to receive from the first mixing chamber (110) a mixture resulting from mixing the first solution and the at least second solution, and
   b) at least one septum (137) located within the at least one first capillary element (130), which divides the cross section of the at least one first capillary element (130) in a plurality of capillary channels (133, 134, 135, 136),
      wherein the at least one first capillary element (130) comprises a reduction of section along its longitudinal axis between the first end (131) of the at least one first capillary element (130) and the second end (132) of the at least one first capillary element (130).

As defined above, the anti-clogging microfluidics multichannel device (100) of the present invention comprises a first mixing chamber (110) comprising a first (111) and a second (112) end, wherein the first end (111) comprises at least one inlet (120) connected in fluid communication with the first mixing chamber (110).

The term "mixing chamber" refers to a recipient with a volume where at least two fluids can be mixed. In the context of the present invention, the term "mixing" refers to the molecular diffusion of one fluid into another in order to reach uniform distribution of both fluids in terms of concentrations, both fluids being immiscible to each other and presenting co-fluent laminar flows.

Suitable recipients for the mixing chamber of the present invention are shaped glasses, quartzes, plastics or even metal containers as long as they are feasible for microscopy observation and surface modification, as for example, capillaries.

In a particular embodiment, the first mixing chamber (110) is a capillary.

The term "capillary" refers to very thin volumes, normally tubes, made of a rigid material, such as plastic or glass, in which a fluid flows up into the tubes in a process called "capillary action" ("capillarity"). In the capillarity or capillary action, a fluid moves in an upward direction against the force of gravity.

Thus, in another particular embodiment, the first mixing chamber (110) is a capillary tube, preferably having an outer diameter between 0.8 and 1.9 mm, even more preferably having an inner diameter between 0.5 and 1.5 mm.

In order to clearly define the structure of the first mixing chamber (110), it has been identified the ends of the first mixing chamber, a first (111) and a second (112) end.

The first end (111) is an open end and is configured to house the at least one inlet (120) which is in fluid communication with the interior of the first mixing chamber (110).

Therefore, the anti-clogging microfluidics multichannel device (100) as defined above also comprises at least one inlet (120) connected in fluid communication with the first mixing chamber (110).

The at least one inlet (120) is configured to provide a fluid communication with the interior of the first mixing chamber (110) in order to inject the first solution inside the first mixing chamber (110).

Thus, the first mixing chamber (110) is configured:
to receive a first solution through the at least one inlet (120), and
to mix said first solution with at least a second solution.

Mixing in microfluidic devices is difficult due to the fact that said microfluidic devices present a laminar regime having low Reynolds numbers. The term "Reynolds number" or "Re" refers to a dimensionless quantity defined as the ratio of inertial forces to viscous forces within a fluid which is subjected to relative internal movement due to different fluid velocities. The hydraulic diameter (L) of the channels commonly found in microfluidic devices is typically low, on the order of 100 μm, and combined with typically small (~1 mm/s) flow velocities (or flow rates) (V) due to extremely high back pressures and typical kinematic viscosities (ν) on the order of $10^{-6}$ m$^2$/s, leads to low Reynolds numbers (VL/ν) for flow in microchannels (on the order of 0.1). The low Reynolds number implies that viscous forces are dominating over inertial forces within the flow, dampening out any flow turbulence that might aid in fluid mixing. As a result, flows in microfluidic devices are almost always laminar in nature. Since the Reynolds number for flow is so small within microfluidic devices, they are unable to harness the advantages of turbulent mixing that can be found in macro-scale systems. As a result, microfluidic devices must rely solely on diffusive mixing, which is an inherently slower process and requires a long channel to achieve sufficient mixing [Ward. K. and Fan Z. H. J. Micromech. Microeng. 2015; 25(9), pii: 094001].

Therefore, since the microfluidic device of the present invention should be operated in laminar regime (and thus, having low Reynold number) to control the size of the droplets to be prepared, operation time and dimensions of the channels of the microfluidic device are optimized by imposing controlled flow rates. In particular, flow rates can be controlled by connecting at least one pump to the at least one inlet (120).

In the context of the present invention, the term "pump" refers to any device that moves fluids by mechanical action. Non-limiting examples of pumps suitable in the microfluidic device of the present invention are syringe pumps.

In case than more than one pump is present, they can be either the same or a combination of different ones.

In a preferred embodiment, the device (100) comprises two inlets. Advantageously, this embodiment allows supplying a plurality of solutions at the same time to the first mixing chamber (110).

Thus, in a preferred embodiment, the first mixing chamber (110) is configured:
to receive a first solution through one inlet (120),
to receive a second solution through the other inlet, and
to mix said first solution with at least a second solution.

The anti-clogging microfluidics multichannel device (100) as defined above also comprises at least one first capillary element (130).

The at least one capillary element (130) comprises a first (131) and a second (132) end.

In a particular embodiment, the first end (131) of the at least one first capillary element (130) is housed in the first mixing chamber (110).

Therefore, the at least one capillary element (130) is connected in fluid communication with the first mixing chamber (110) through the first end (131) of the at least one first capillary element (130) which is connected in fluid communication with the second end (112) of the first mixing chamber (110).

In a particular embodiment, the at least one first capillary element (130) is a capillary, preferably a capillary tube, more preferably a capillary tube having an outer diameter between 0.9 and 1.9 mm, even more preferably having an inner diameter between 0.5 and 1.6 mm, even more preferably having a length between 3 cm and 6 cm.

In a preferred embodiment, the first end (131) has an outer diameter between 0.8 and 1.8 mm, more preferably having an inner diameter between 0.4 and 1.5 mm.

The mixture resulting from the first mixing chamber (110) is transferred to the at least one capillary element (130). Therefore, the at least one capillary element (130) is configured to receive from the first mixing chamber (110) a mixture resulting from mixing the first solution and the at least second solution.

In the particular case that a pump is connected to the system, due to the pressure exerted by the pump, the mixture resulting from the first mixing chamber (110) is transferred to the at least one capillary element (130). Therefore, the at least one capillary element (130) is configured to receive from the first mixing chamber (110) a mixture resulting from mixing the first solution and the at least second solution.

The connection between the first end (131) of at least one first capillary element (130) and the second end (112) of the first mixing chamber (110) should be watertight.

Therefore, in a preferred embodiment, the connection between the first end (131) of the at least one first capillary element (130) and the second end (112) of the first mixing chamber (110) comprises a first seal (140) configured to provide a watertight connection between the first end (131) of the at least one first capillary element (130) and the second end (112) of the first mixing chamber (110). Advantageously, this embodiment avoids any leakage in the fluid communication and, as a consequence, enhancing the efficiency of the device (100).

The first seal (140) may be any element which provides watertightness between the first mixing chamber (110) and the at least one first capillary element (130), with a wider cross section which houses both elements. According to the present invention, the first seal (140) can be made of glass, quartz, plastic, metal or any combination thereof. Non-limiting examples of elements suitable as the first seal (140) are a rubber seal and a glass capillary.

In a particular embodiment, the first seal (140) is a glass capillary, preferably a square glass capillary or a rectangular glass capillary.

The at least one capillary element (130) further comprises, as defined above, at least one septum (137) inside. The term "septum" should be understood as a wall which divides the cross section of the at least one capillary element (130) into a plurality of channels. Thus, the at least one "septum" or "wall" divides the flux of the fluid which goes through the first capillary element (130).

The authors of the present invention have observed that at least one septum (137) located within the at least one first capillary element (130) reduced the likelihood of clogging being for a standard one channel microfluidic device of 50%, i.e., blocked or not. Therefore, advantageously, the plurality of channels reduces the likelihood of clogging, providing an anti-clogging microfluidic multichannel device which can be produced in large scale. For example, for a microfluidic device comprising at least one capillary element (130) having its cross section divided into four channels by a septum (137), the likelihood of having the microfluidic device fully clogged is reduced to 25%.

Therefore, the at least one capillary element (130) further comprises, as defined above, at least one septum (137) located within the at least one first capillary element (130), which divides the cross section of the at least one first capillary element (130) in a plurality of capillary channels (133, 134, 135, 136).

In a particular embodiment, the number of capillary channels is at least 3. Preferably the number of capillary channels is 4.

Furthermore, the second end (132) of the at least one capillary element (130) is an open end wherein its cross section is smaller than the cross section of the first end (131) of the least one capillary element (130). Advantageously, the reduction of section favors the generation of droplets of the mixture resulting from mixing the first solution and the at least second solution.

In a particular embodiment, the ratio between the cross section of the first end (131) and the second end (132) of the at least one capillary element (130) is between 5 and 20. Advantageously, these embodiments facilitate the transport of the droplets.

In a particular embodiment, the second end (132) of the at least one first capillary element (130) is an opened truncated cone end, preferably having an inner diameter between 70 and 130 µm, more preferably having a length between 500 and 1100 µm, even more preferably having an angle between 10 and 30°.

In addition, the device (100) of the present invention allows parallelization of more than one first capillary element (130). This embodiment increases the production rate of microfluidics systems since the likelihood of clogging is further reduced respect to the device (100) of the present invention having one single first capillary element (130).

Therefore, in another particular embodiment, the first mixing chamber (110) further comprises at least one intermediate channel (150) connected in fluid communication between the first mixing chamber (110) and the at least one first capillary element (130).

In a more particular embodiment, the anti-clogging microfluidic multichannel device (100) comprises two first capillary elements (130, 130') and two intermediate channels (150, 150'), wherein the first end (131, 131') of each first capillary element (130, 130') is connected in fluid communication with each intermediate channel (150, 150') and being the number of capillary channels in each first capillary element (130, 130') four.

In a particular embodiment, the anti-clogging microfluidic multichannel device is made of glass.

The authors of the present invention have observed that microfluidics systems comprising an anti-clogging multichannel device (100) as defined above present an increased useful lifetime and production rate since it decreases the risk of getting fully blocked.

Therefore, in a second inventive aspect, the invention provides a microfluidics system (1) comprising:
 i. an anti-clogging multichannel device (100) as defined above,
 ii. a mixing device (200) comprising
  a) a second mixing chamber (210) comprising a first (211) and a second (212) end, and
  b) at least one second capillary element (220) with a first (221) and a second (222) end, wherein the at least one second capillary element (220) comprises an increase of section along its longitudinal axis between the first end (221) of the at least one second capillary element (220) and the second end (222) of the at least one second capillary element (220),
  wherein the second end (132) of the at least one first capillary element (130) is connected in fluid communication with the first end (221) of the at least one second capillary element (220) through the second mixing chamber (210), and
  wherein the second mixing chamber (210) is configured:
   to house at least a third solution,
   to house the second end (132) of the at least one first capillary element (130) and the first end (221) of the at least one second capillary element (220), and
   to receive the mixture resulting from mixing the first solution and the at least second solution through the second end (132) of the at least one first capillary element (130).

Therefore, the microfluidics system (1) as defined above comprises the anti-clogging multichannel device (100) of the present invention and a mixing device (200).

The mixing device (200) comprises a second mixing chamber (210) comprising a first (211) and a second (212) end, and at least one second capillary element (220) with a first (221) and a second (222) end.

The second mixing chamber (210) has similar technical features as those explained for the first mixing chamber (110). The second mixing chamber (210) provides fluid communication between the second end (132) of the at least one first capillary element (130) and the first end (221) of the least one second capillary element (220), which are both housed inside the second mixing chamber (210) and in such a way that both the second end (132) and the first end (221) are proximate to each other but not in direct physical contact.

In a particular embodiment, the least one second capillary element (220) is a capillary tube, preferably having an outer diameter between 0.9 mm and 1.9 mm, more preferably having an inner diameter between 0.4 mm and 1.5 mm, even more preferably having a length between 2.0 cm and 5.0 cm.

In a particular embodiment, the separation between the second end (132) and the first end (221) is between 30 and 100 µm.

In a particular embodiment, the second mixing chamber (210) is a capillary, more particularly a square capillary or a rectangular capillary, preferably having an inner cross-section side length between 0.8 mm and 1.5 mm.

In a preferred embodiment, the second mixing chamber (210) is made of glass.

As previously defined, the at least one second capillary element (220) of the mixing device (200) comprises an increase of section along its longitudinal axis between its first end (221) and the second end (222) of the at least one second capillary element (220).

In a particular embodiment, the first end (221) of the at least one second capillary element (220) is an opened truncated cone end, preferably having an inner diameter between 0.18 mm and 0.41 mm, more preferably having a length between 0.8 mm and 2.0 mm, even more preferably having an angle between 18 and 38°.

In the context of the present invention, the term "microfluidics system" refers to a device configured to produce droplets as precursors for the preparation of multiple emulsions.

The term "emulsion" refers to a mixture of two or more liquids that are normally immiscible. Emulsions are part of a more general class of two-phase systems of matter called colloids. Emulsions can be classified as single or double (also called multiple) emulsions. Single emulsions have the dispersed phase in the micron size range (1-50 µm). Double or multiple emulsions are complex systems wherein droplets of one liquid are first dispersed in larger droplets of a second liquid, which is then dispersed in the final continuous phase. Multiple emulsions may be of the 'oil-in-water-in-oil' (O/W/O) type or the reverse (W/O/W). Double and Multiple emulsions structures are in the range of 50-300 µm diameter.

Non-limiting examples of multiple emulsions suitable in the microfluidic system of the present invention are polymersomes, liposomes, microcapsules (such as colloidosomes or hydrogel), microgels and ceramic microspheres.

In a particular embodiment, the microfluidics system (1) of the present invention is configured to produce polymersomes.

The term "polymerosomes" (also named as "polymer vesicles") refers to assembled spherical structures with an aqueous core that is enclosed by a bilayer membrane usually composed of diblock copolymer amphiphiles.

Polymersomes combine the ability to encapsulate hydrophobic compounds in the bilayer and hydrophilic actives in the aqueous interior at the same time. The proposed mechanism for the formation of polymerosomes is based on a droplet-to-vesicle evolution process. Said process starts by the formation of core/shell droplets formed by a first solution (usually an aqueous solution) encapsulated into a shell formed by at least one second solution (usually a polymer solution). After that, core/shell droplets evolve to polymer vesicles (or polymerosomes) by evaporation of the solvent in the shell due to osmotic pressure. The microfluidic system of the present invention allows obtaining double and multiple emulsions with different core numbers, preferably from 1 to 4, which can be obtained by changing the flow rate of the first solution.

To this end, control of the wetting properties of the inner surfaces of the device (1) is necessary.

Thus, in a particular embodiment, at least a portion of the inner surface of the first mixing chamber (110) is chemically treated to render it hydrophobic.

In another particular embodiment, at least a portion of the inner surface of the plurality of capillary channels (133, 134, 135, 136) also comprises a hydrophobic treatment. Preferably, the whole inner surface of the plurality of capillary channels (133, 134, 135, 136) is hydrophobically treated.

Non-limiting examples of hydrophobic treatment are treatment with silanes such as n-octadecyl trimethoxyl silane, trichloro (1H,1H,2H,2H-perfluorooctyl) silane, trimethoxy (octadecyl) silane, diethyl dichloro silane, hepta decafluoro decyltrimethoxy silane, octadecyl trichloro silane and tris (trimethylsiloxy) silylethyl dimethyl chlorosilane.

In a preferred embodiment, at least a portion of the inner surface of the first mixing chamber (110) and/or at least a portion of the inner surface of the plurality of channels (133, 134, 135, 136) is treated with n-octadecyltrimethoxyl silane.

In another particular embodiment, at least a portion of the inner surface of the one second capillary element (220) comprises a hydrophilic treatment.

Non-limiting examples of hydrophilic treatment are treatment with silanes such as 2-[methoxy(polyethyleneoxy) propyl] trimethoxyl silane, acetoxymethyltrimethoxy silane, acetoxymethyldimethylacetoxy silane, 2-(carbomethoxy) ethyltrichlorosilane, methoxy triethylene oxypropyl trichlorosiliane, 3-methoxy propyl trimethoxy silane and methoxy ethoxy undecyl trichloro silane.

In a preferred embodiment, at least a portion of the inner surface of the at least one second capillary element (220) is treated with 2-[methoxy(polyethyleneoxy) propyl] trimethoxyl silane.

In a particular embodiment, once all of the elements of the microfluidics system (1) are assembled together, a sealing is carried out, as for example, an epoxy sealing.

A final aspect of the present invention is directed to a method of production of multiple emulsions comprising the following steps:

a) providing a microfluidics system as defined above;
b) injecting a first solution through at least one inlet (120);
c) mixing the first solution with at least a second solution in a first mixing chamber (110);
d) letting the mixture resulting from step (c) from the first mixing chamber (110) flow to a second mixing chamber (210) through at least one first capillary element (130);
e) mixing the mixture resulting from step (d) with at least a third solution in a second mixing chamber (210) to produce multiple emulsions; and
f) outputting the multiple emulsions resulting from step (e) by the second end (222) of at least one second capillary element (220).

The microfluidic system as defined above should be operated in laminar regime in order to control the size of the droplets to be prepared. To this end, flow rates are controlled by, for example, connecting at least one pump to the at least one inlet (120) in the microfluidic device of step (a).

Therefore, the first solution is mixed in step (c) with at least a second solution in a first mixing chamber (110) under laminar regime.

Therefore, the mixture resulting from step (d) is mixed in step (e) with at least a third solution in a second mixing chamber (210) under laminar regime.

Moreover, in the context of the present invention, the first solution is immiscible with the at least one second solution and the at least one second solution is immiscible with the at least one third solution. The first solution and the at least one third solution may be miscible or immiscible to each other.

Suitable first solutions for the device (100) of the present invention are organic solvent solutions, such as decane solutions, and aqueous solutions such as a polyethylene glycol (PEG) aqueous solution.

In a preferred embodiment, the first solution is an aqueous solution.

Non-limiting examples of the at least one second solution suitable for the device (100) of the present invention are polymer solutions such as ethoxylated trimethylol propane triacrylate (TMPEOTA) resin solution or a HFE-7500 engineering fluid solution, volatile organic solutions such as amphiphilic block copolymers/homopolymers/lipids solutions and aqueous solutions.

In a preferred embodiment, the at least one second solution is a polymer solution.

Non-limiting examples of at least a third solution suitable in the system (1) as defined above are aqueous solutions such as poly(vinyl alcohol) aqueous solution, silicone oil solutions such as Dow Corning 749 Fluid, 1-Decanol solutions such as span 80 and hexadecane solutions such as Abil EM90.

In a preferred embodiment, the at least a third solution is an aqueous solution.

In some aspect, the present invention is directed to the use of the anti-clogging microfluidic multichannel device (100) as defined above as component in microfluidics systems.

In another aspect, the present invention is directed the use of the microfluidics system (1) as define above in the production of multiple emulsions, preferably, polymersomes.

The present invention provides for the following clauses, the numbering of which is not to be construed as designating levels of importance:

Clause 1.—An anti-clogging microfluidic multichannel device (100) comprising:
 i. a first mixing chamber (110) comprising a first (111) and a second (112) end, wherein the first end (111) comprises at least one inlet (120) connected in fluid communication with the first mixing chamber (110),
  wherein the first mixing chamber (110) is configured
   to receive a first solution through the at least one inlet (120), and
   to mix said first solution with at least a second solution, and
 ii. at least one first capillary element (130) comprising
  a) a first (131) and a second (132) end,
   wherein the first end (131) of the at least one first capillary element (130) is connected in fluid communication with the second end (112) of the first mixing chamber (110), and is configured to receive from the first mixing chamber (110) a mixture resulting from mixing the first solution and the at least second solution, and
  b) at least one septum (137) located within the at least one first capillary element (130), which divides the cross section of the at least one first capillary element (130) in a plurality of capillary channels (133, 134, 135, 136),
   wherein the at least one first capillary element (130) comprises a reduction of section along its longitudinal axis between the first end (131) of the at least one first capillary element (130) and the second end (132) of the at least one first capillary element (130).

Clause 2.—The device (100) according to clause 1, further comprising two inlets.

Clause 3.—The device (100) according to any of clauses 1 to 2, wherein the first end (131) of the at least one first capillary element (130) is housed in the first mixing chamber (110).

Clause 4.—The device (100) according to any of clauses 1 to 3, wherein the at least one first capillary element (130) is a capillary tube.

Clause 5.—The device (100) according to any of clauses 1 to 4, wherein the connection between the first end (131) of the at least one first capillary element (130) and the second end (112) of the first mixing chamber (110) comprises a first seal (140) configured to provide a watertight connection between the first end (131) of the at least one first capillary element (130) and the second end (112) of the first mixing chamber (110).

Clause 6.—The device (100) according to any of clauses 1 to 5, wherein at least a portion of the inner surface of the first mixing chamber (110) comprises a hydrophobic treatment.

Clause 7.—The device (100) according to any of clauses 1 to 6, wherein the number of capillary channels in the at least one first capillary element (130) is at least 3.

Clause 8.—The device (100) according to any of clauses 1 to 7, wherein at least a portion of the inner surface of the plurality of capillary channels (133, 134, 135, 136) comprises a hydrophobic treatment.

Clause 9.—The device (100) according to any of clauses 1 to 8, wherein the first mixing chamber (110) further comprises at least one intermediate channel (150) connected in fluid communication between the first mixing chamber (110) and the at least one first capillary element (130).

Clause 10.—The device (100) according to clause 9, comprising two first capillary elements (130, 130') and two intermediate channels (150, 150') wherein the first end (131, 131') of each first capillary element (130, 130') is connected in fluid communication with each intermediate channel (150, 150'), and being the number of capillary channels in each first capillary element (130, 130') four.

Clause 11.—The device (100) according to any of clauses 1 to 10, wherein the second end (132) of the at least one first capillary element (130) is an opened truncated cone end.

Clause 12.—The device (100) according to any of clauses 1 to 11, wherein the ratio between the cross section of the first end (131) of the at least one capillary element (130) and the cross section of the second end (132) of the at least one capillary element (130) is between 5 and 20.

Clause 13.—A microfluidics system (1) comprising:
 i. an anti-clogging multichannel device (100) according to any of clauses 1 to 12,
 ii. a mixing device (200) comprising
  a) a second mixing chamber (210) comprising a first (211) and a second (212) end, and
  b) at least one second capillary element (220) with a first (221) and a second (222) end, wherein the at least one second capillary element (220) comprises an increase of section along its longitudinal axis between the first end (221) of the at least one second capillary element (220) and the second end (222) of the at least one second capillary element (220),
  wherein the second end (132) of the at least one first capillary element (130) is connected in fluid communication with the first end (221) of the at least one second capillary element (220) through the second mixing chamber (210),
   wherein the second mixing chamber (210) is configured:
    to house at least a third solution,
    to house the second end (132) of the at least one first capillary element (130) and the first end (221) of the at least one second capillary element (220), and to receive the mixture resulting from mixing the first solution and the at least second solution through the second end (132) of the at least one first capillary element (130).

Clause 14.—The system according to clause 13, wherein the first end (221) of the at least one second capillary element (220) is an opened truncated cone end.

Clause 15.—The system (1) according to any of clauses 13 to 14, wherein at least a portion of the inner surface of the one second capillary element (220) comprises a hydrophilic treatment.

Clause 16.—A method of production of multiple emulsions comprising the following steps:
a) providing a microfluidics system according to any of clauses 13 to 14;
b) injecting a first solution through at least one inlet (120);
c) mixing the first solution with at least a second solution in a first mixing chamber (110);
d) letting the mixture resulting from step (c) from the first mixing chamber (110) flow to a second mixing chamber (210) through at least one first capillary element (130);
e) mixing the mixture resulting from step (d) with at least a third solution in a second mixing chamber (210) to produce multiple emulsions; and
f) outputting the multiple emulsions resulting from step (e) by the second end (222) of at least one second capillary element (220).

Clause 17.—The method according to clause 15, wherein the first solution is an aqueous solution.

Clause 18.—The method according to any of clauses 16 to 17, wherein the at least second solution is a polymer solution.

Clause 19.—The method according to any of clauses 16 to 18, wherein the third solution is an aqueous solution.

Clause 20.—Use of the anti-clogging microfluidic multichannel device according to any of clauses 1 to 12 as component in a microfluidics system.

Clause 21.—Use of the microfluidics system (1) according to any of clauses 13 to 15 in the production of multiple emulsions.

EXAMPLES

Example 1—Construction of a Glass Capillary-Based Microfluidics Device

Figure 2:
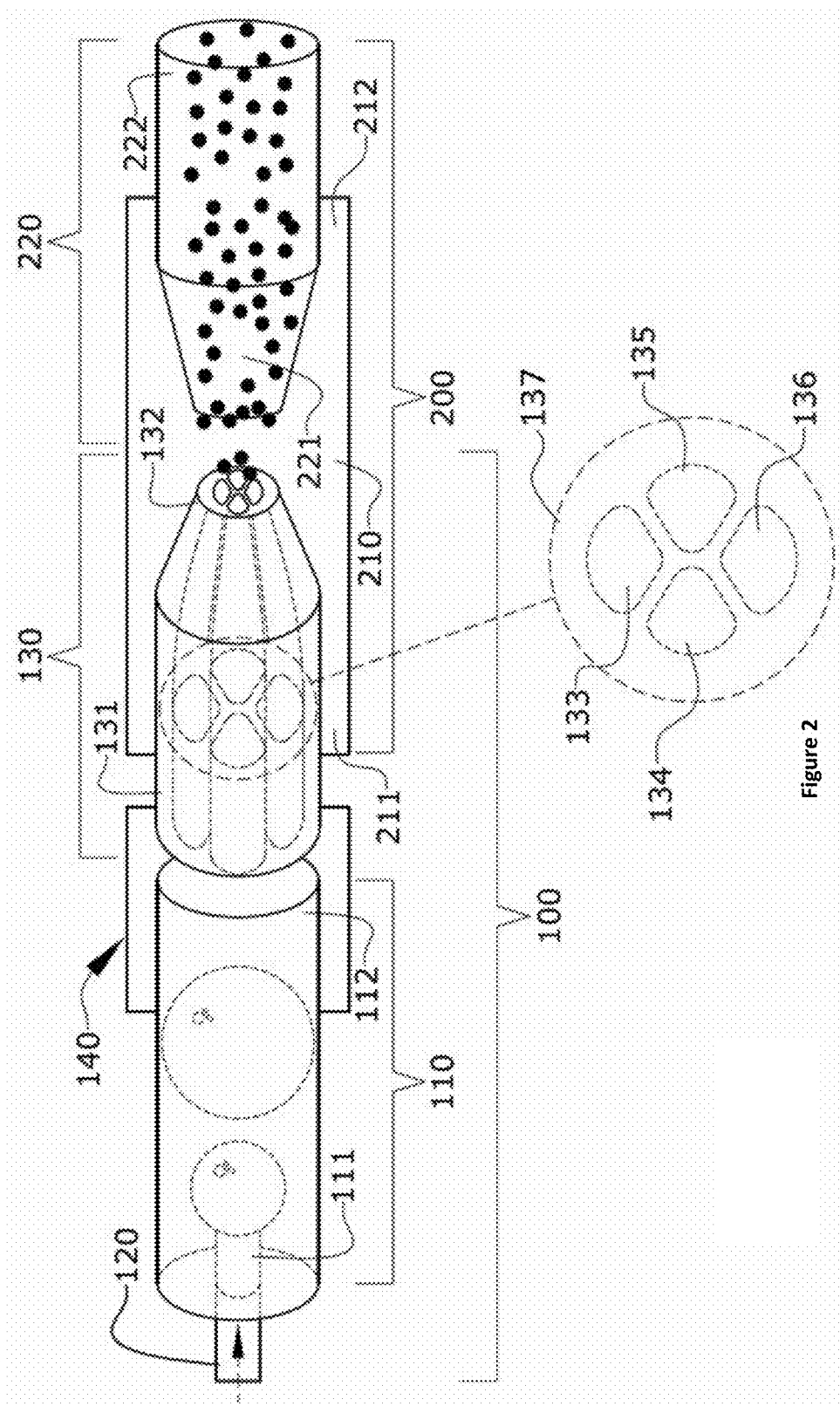
FIG. 2. Profile representation of an embodiment of the microfluidics system (1).
Figure 3:
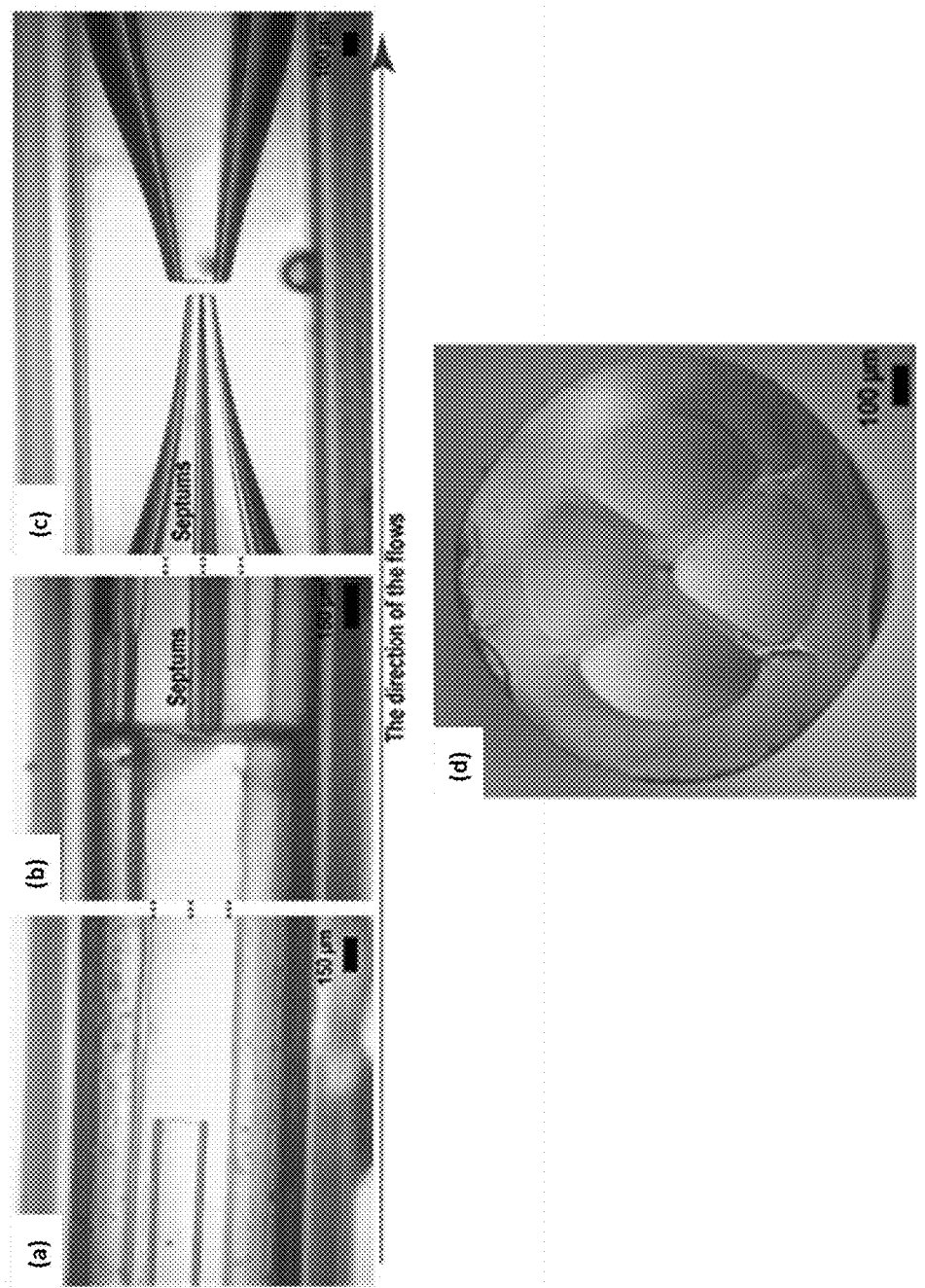
FIGS. 3A-3D. (a)-(c) Photomontage of the microfluidics system (1); and (d) cross-section view of the capillary element (130).

FIGS. 1-3 show a glass capillary-based microfluidic device constructed as follows.

A Theta cross-section-capillary (OD (outer diameter)=1.00 mm, Hilgenberg GmbH) and a standard round capillary (OD=1.00 mm, Vitrocom) were pulled by micropuller (PC-10 puller, Narishige) and tapered by microforge (MF-830 Microforge, Narishige) with inner diameter of ~95 µm and 220 µm, respectively. In this example, the Theta cross-section-capillary is the first capillary element (130) and the standard round capillary is the second capillary element (220). Therefore, after the pulling, the inner diameter (ID) of the cross section of the second end (132) of the Theta cross-section-capillary (130) was 95 µm and the ID of the cross section of the first end (221) of the standard round capillary (220) was 220 µm. The length of the second end (132) was 866 µm and the length of the first end (221) was 1.751 mm. The angle of the second end (132) was ~12° and the angle of the first end (221) was 22°.

The 220 µm inner diameter of the cross section of the standard round capillary (220) was treated by 2-[methoxy (polyethyleneoxy) propyl]trimethoxy silane (Gelest, Inc.) to make it hydrophilic while the 95 µm inner diameter of the cross section of the Theta cross-section-capillary (130) was treated by trichloro(octadecyl)silane (Sigma-Aldrich) to render it hydrophobic. Subsequently, the two modified round capillaries (220, 130) were oppositely inserted into a square capillary tubing (210), with an inner cross-section side length of 1.05 mm (Vitrocom). The separation of the two tips (132, 221) was approximately 60 µm.

Meanwhile, the left side of the Theta capillary (131) was inserted into another short square glass capillary (140) with the same hydrophobic treatment and having an outer diameter of 1.00 mm and an inner diameter of 1.00 mm. On the left side of the short square glass capillary (140), a second hydrophobically treated round glass capillary (110) was placed having an outer diameter of 1.00 mm and an inner diameter of 1.00 mm. Inside this short square capillary (140), the left side of the theta capillary (131) was carefully and tightly contacted with the right side of the round capillary (112).

Finally, a third round capillary (120) with an inner diameter of the cross section of 200 µm was inserted from a round (cylindrical) capillary with outer diameter of 1.00 mm into the second round capillary (111), the tip of this third capillary (120) was close to the left side of the theta capillary (131). The inner diameter and the outer diameter of the tip part are 180 µm and 280 µm.

Subsequently, all of the capillaries were assembled together to provide the system with syringe needle inlets and outlets and finally epoxy sealing of the capillaries and the needles was performed.

Example 2—Fabrication of Ultrathin Core/Shell Droplets

Figure 4:
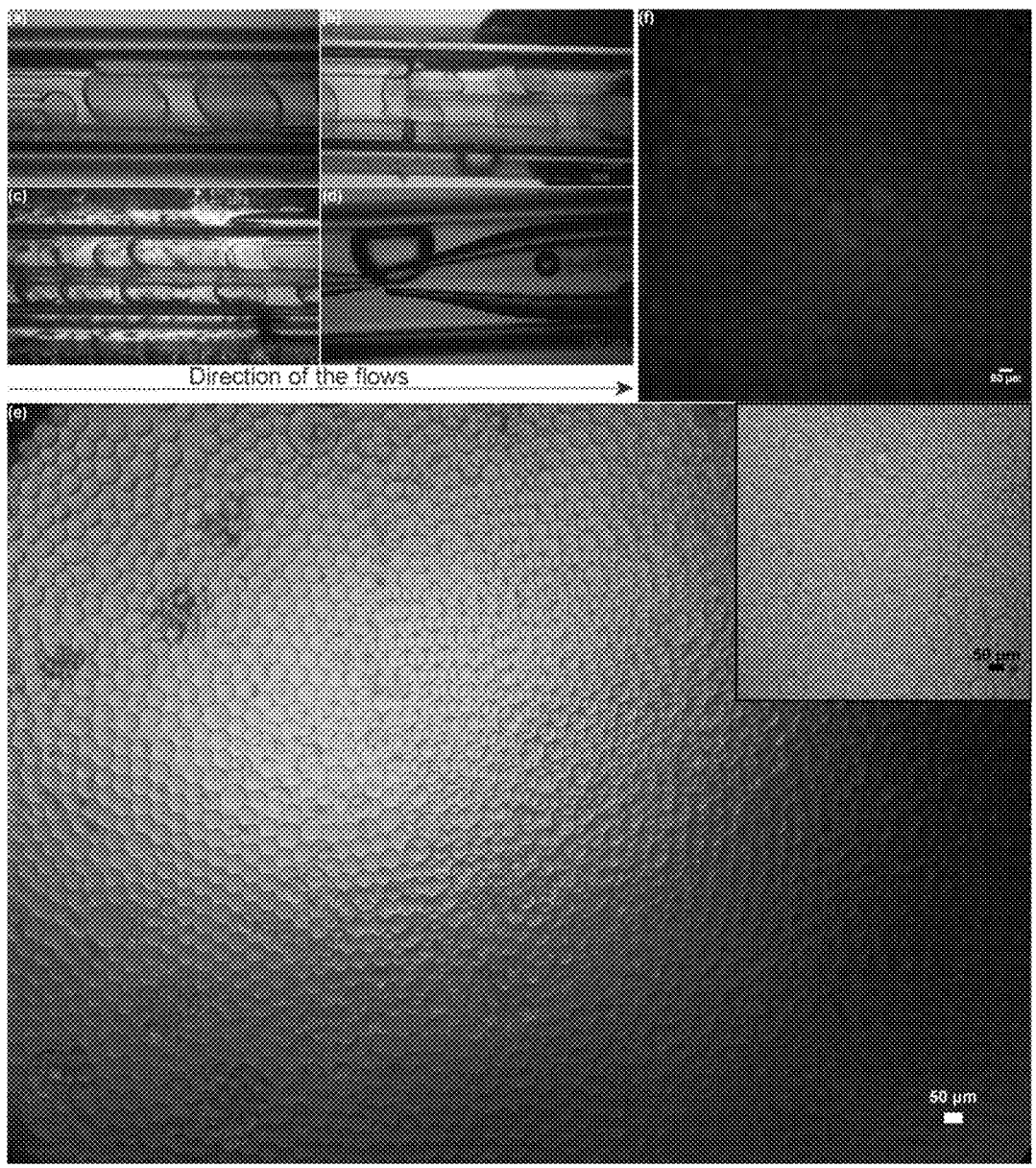
FIGS. 4A-4F. (a)-(d) High throughput fabrication of polymersomes within microfluidics system (1) of the working examples 1-3; (e) bright field optical microscopy image of the prepared polymersomes in working example 3; and (f) fluorescent microscope image of said polymersomes filled inside with Rhodamine B.

FIGS. 4(*a*) to 4(*d*) shown an example of the fabrication of the droplets with the glass capillary-based microfluidics device of the previous section Example 1.

In particular, three phases were used for the fabrication of droplets. Aqueous solution of 10 wt % PVA, 5 mg/mL of PB65-b-PEO35 in mixture solution of Cyclohexane/Chloroform (w/w=6/4) were used as outer and middle phases, respectively. The inner phase was an aqueous solution of 10 wt % of PEG6000 with trace amount of Rhodamine b. For some experiments to label the polymer shell layer, a tiny amount of Nile red was added to the middle organic phase.

The three phases were then injected into the above microfluidic device by three programmable syringe pumps (NE-1000, New Era) with flow rates precisely adjusted so as to operate in laminar regime and to generate monodispersed double emulsion droplets, as follows. For the one-theta capillary device, stable monodispersed ultrathin shell droplets can be generated when the flow rates of outer, middle and inner phases were set at 9.0, 2.0 and 1.0 mL/h, respectively. Under these specific conditions, the resulting polymersomes have average diameters of approximately 97±8 µm (FIG. 4(*e*)).

Example 3—Collection of the Droplets of Example 2 and Formation of Polymer Vesicles FIG. 4(*a*)-(*e*) shows the collected droplets and the formation of polymer vesicles.

In particular, the double emulsions were delivered through a plastic tubing (Polyethylene, inner diameter of the cross section of 820 µm) and collected in a 5 mL glass vial with 2 mL of collecting solution (50 mM of aqueous solution of NaCl) to quickly form polymer vesicles. The glass sample vial was directly placed under an optical microscope (3032 Inverted Microscope, ACCU-Scope) with a digital camera connected for characterization. The camera, controlled by Pixelink software, recorded the images. For fluorescence microscopy, the samples were placed under an inverted Zeiss microscope operating in fluorescence mode. All images were processed using the public domain available software Image J.

Figure 5:
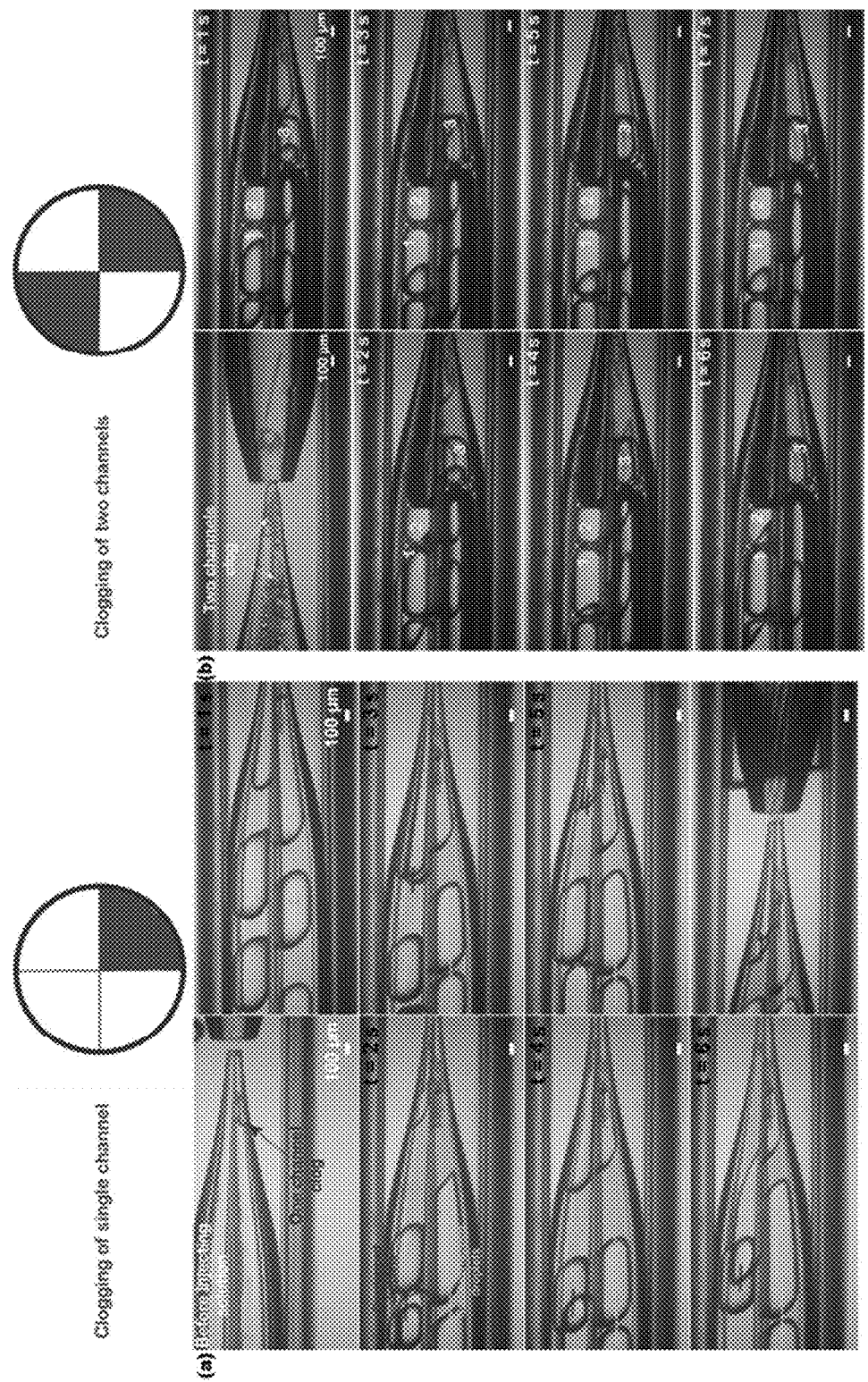
FIG. 5. Microscopic images illustrating clogging of the microfluidic device (1) under two different situations: (a) single channel clogging and (b) dual-channel clogging. Schematic figures on the top part display the situation when the corresponding channel(s) is (are) clogged.

FIG. 5 illustrates two cases of channel clogging: (left) single channel clogging; and (right) two channels clogging. The microscopy images showed the device is still actively working even if one or two channels are blocked by undesired granules.

Figure 6:
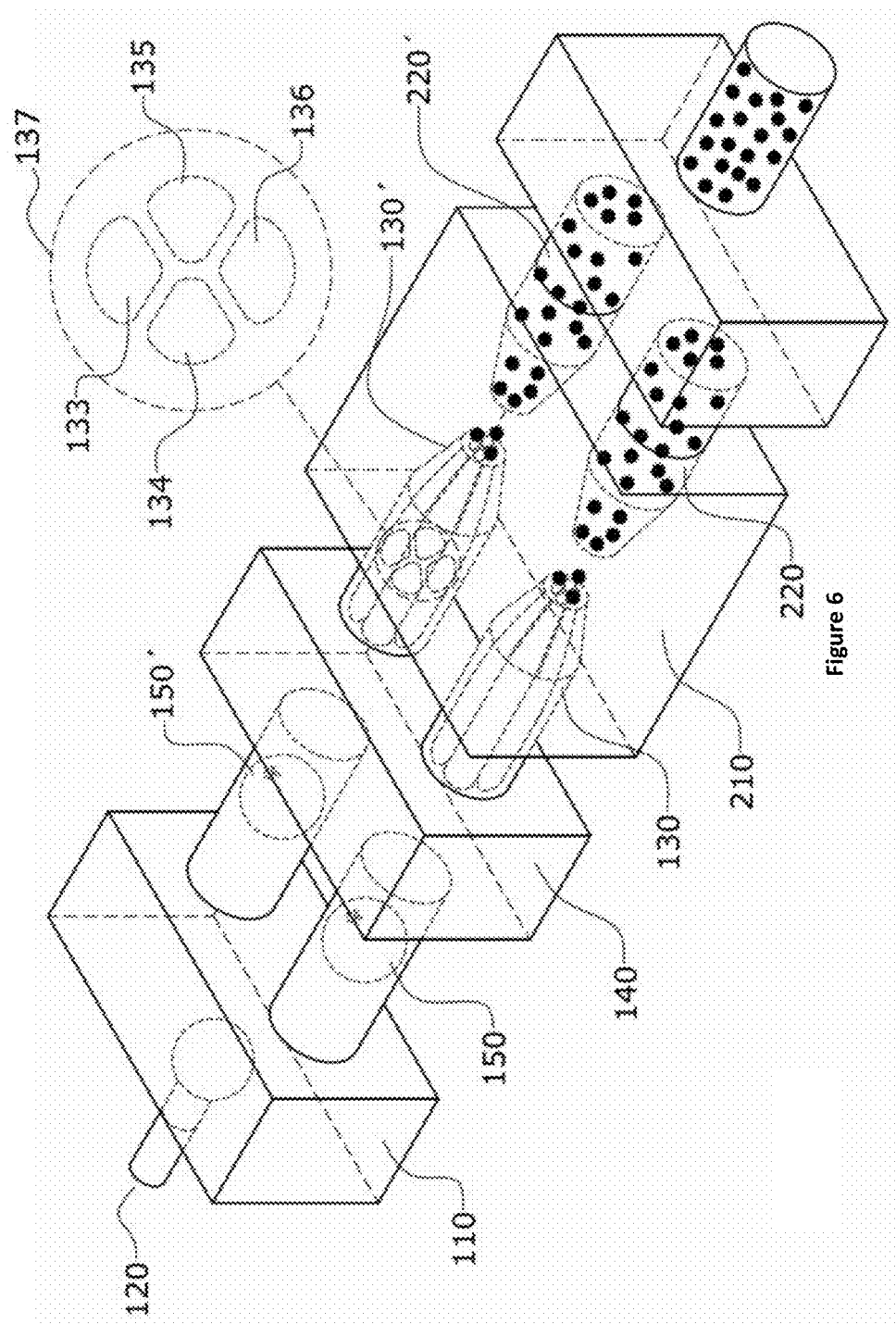
FIG. 6. Isometric representation of an embodiment of the microfluidics system (1) wherein two capillaries elements (130, 130') are parallelized and having two intermediates channels (150, 150').
Figure 7:
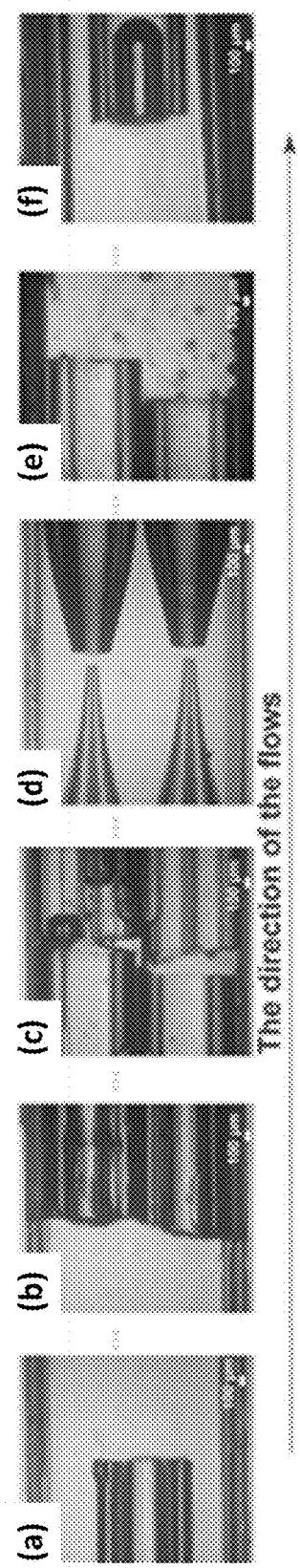
FIGS. 7A-7F. (a)-(f) Photomontage of the parallelized microfluidics system (1).

Example 4—Construction of a Parallelized Glass Capillary-Based Microfluidics Device FIG. 6 shows an example of a parallelized glass capillary-based microfluidic device constructed as follows. Two Theta cross-section-capillaries ((130, 130'), OD=1.00 mm, Hilgenberg GmbH) with inner diameter of the cross section of 95 µm and, two standard round capillaries ((220, 220'), OD=1.00 mm, Vitrocom) with inner diameter of the cross section of 220 µm were pulled by micropuller (PC-10 puller, Narishige) and tapered by microforge (MF-830 Microforge, Narishige).

Each 220 µm inner diameter of the cross section of the standard round capillary (220, 220'), i.e., the inner surface of the capillary (220, 220'), was treated by 2-[methoxy(polyethyleneoxy) propyl]trimethoxyl silane (Gelest, Inc.) to make it hydrophilic. Additionally, the 95 µm inner diameter of the cross section of the of Theta cross-section-capillaries (130, 130'), i.e., the inner surface of each capillary (130, 130'), were treated by trichloro(octadecyl)silane (Sigma-Aldrich) to render it hydrophobic. Subsequently, the Theta cross-section-capillaries (130, 130', 220, 220') were oppositely inserted into a rectangular cross-section capillary tubing (210), with a cross-section side length of 2.00 mm×1.00 mm (Vitrocom). Each element of the pair of 220 µm inner diameter of the cross section of the standard round capillary (220, 220') and the 95 µm inner diameter of the cross section of the of Theta cross-section-capillaries (130, 130') are located in the same longitudinal axis. The separation of the two tips (132, 221) of each pair was approximately 60 µm.

Meanwhile, the left side of the Theta cross-section-capillary (131) was inserted into another short rectangular glass capillary (140) (2.00 mm×1.00 mm inner part size) with the same hydrophobic treatment. On the left side of the short square glass capillary (140), two silane round glass capillary (150, 150') hydrophobically treated with 2-[methoxy(polyethyleneoxy) propyl]trimethoxyl were placed as intermediate channels.

Then, a further hydrophobically treated round glass capillary (110) was placed. Inside this short square capillary (140), the left side of the theta capillary (131) was carefully and tightly contacted with the right side of the round capillary (112).

In this example, the first end (131, 131') of each Theta cross-section-capillary (130, 130') is respectively connected in fluid communication with each intermediate channel (150, 150') and in turn, the intermediate channels (150, 150') are in fluid communication with the standard round capillary (110) with inner diameter of the cross section of 220 µm.

Finally, a round capillary (120) with an inner diameter of the cross section of 200 µm was inserted into the round capillary (110), providing fluid communication with the interior of the round capillary (110).

Subsequently, all of the capillaries were assembled together to provide the system with syringe needle inlets and outlets and finally epoxy sealing of the capillaries and the needles was performed.

Example 5—Fabrication of Ultrathin Core/Shell Droplets with a Parallelized Device FIGS. 7(a)-(f) and FIGS. 8(a)-(f) show an example of the fabrication of the droplets with the parallelized glass capillary-based microfluidics device described in Example 4.

In particular, three phases are created as it is above described in the example of the parallelized glass capillary-based microfluidics device.

The three phases were then injected into the above microfluidic device by three programmable syringe pumps (NE-1000, New Era) with flow rates precisely adjusted so as to operate in laminar regime and to generate monodispersed double emulsion droplets, as follows. For the two-theta capillary device, stable monodispersed ultrathin shell droplets can be generated when the flow rates of outer, middle and inner phases were set at 22, 3.5 and 3 mL/h, respectively. Under these specific conditions, the resulting polymersomes have average diameters of approximately 130±15 µm.

Figure 8:
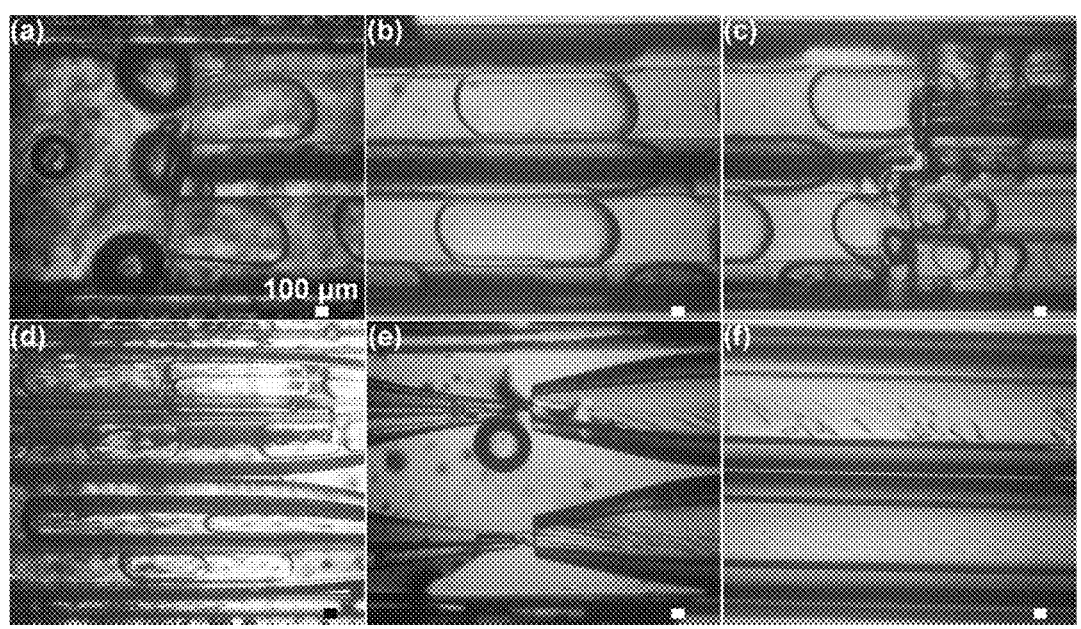
FIG. 8. Photomontage of the flow process inside the microfluidics system of FIG. 6 with two parallelized capillaries elements (130, 130'), which made the number of final injecting channels 8, wherein: (a) a giant w/o emulsions droplet was divided into two w/o emulsion droplets when entering into two separate capillaries elements (130, 130'); (b) the w/o droplets were transported inside the two capillaries elements (130, 130'); (c) the droplets started to enter into the two capillaries elements (130, 130'), each of them having quad channels, and the droplets were separated into smaller droplets; (d) the separated smaller droplets were transported inside the quad-channeled capillaries elements (130, 130'); (e) ultrathin shell w/o/w emulsion droplets were generated; and (f) ultrathin shell droplets were collected inside the collecting second capillary elements (220, 220').

FIG. 8 illustrates the processes taking place in different parts inside the parallelized microfluidics device. The microscopy images show the device is still actively working even if one or two channels are blocked by undesired granules.

Example 6—Collection of the Droplets of Example 5 and Formation of Polymer Vesicles FIG. 8 shows an example of the collected droplets and the formation of polymer vesicles.

In particular, the double emulsions were delivered through two parallelized injecting plastic tubing (Polyethylene, inner diameter of the cross section of 820 µm) which made the number of final injecting channels 8 as follows. The giant w/o emulsions droplet was divided into two w/o emulsion droplets when entering into two separate tubings (FIG. 8(a)). Then, the w/o droplets were transported inside the two tubings (FIG. 8(b)) and the droplets started to enter into the two tubings with each of them has quad channels and the droplets were separated into smaller droplets (FIG. 8(c)). After that, the separated smaller droplets were transported inside the quad-channeled tubings (FIG. 8(d)), ultrathin shell w/o/w emulsion droplets were generated (FIG. 8(e)); and (f) ultrathin shell droplets were collected inside the collecting tubings to quickly form polymer vesicles.

The invention claimed is:
1. An anti-clogging microfluidic multichannel device, the device comprising:
(i) a first mixing chamber comprising a first and a second end, wherein the first end comprises at least one inlet connected in fluid communication with the first mixing chamber,
wherein the first mixing chamber is configured:
to receive a first solution through the at least one inlet, and
to mix said first solution with at least a second solution; and

(ii) at least one first capillary element comprising:
  a) a first and a second end, wherein the first end of the at least one first capillary element is connected in fluid communication with the second end of the first mixing chamber, and is configured to receive from the first mixing chamber a mixture resulting from mixing the first solution and the at least second solution, and
  b) at least one septum located within the at least one first capillary element, which divides the cross section of the at least one first capillary element in a plurality of capillary channels,
wherein the at least one first capillary element comprises a reduction of section along its longitudinal axis between the first end of the at least one first capillary element and the second end of the at least one first capillary element.

2. The device according to claim 1, further comprising two inlets connected in fluid communication with the first mixing chamber and the first mixing chamber is configured to receive a first solution through at least one of the two inlets.

3. The device according to claim 1, wherein the first end of the at least one first capillary element is housed in the first mixing chamber.

4. The device according to claim 1, wherein the at least one first capillary element is a capillary tube.

5. The device according to claim 1, wherein the connection between the first end of the at least one first capillary element and the second end of the first mixing chamber comprises a first seal configured to provide a watertight connection between the first end of the at least one first capillary element and the second end of the first mixing chamber.

6. The device according to claim 1, wherein at least a portion of the inner surface of the first mixing chamber comprises a hydrophobic treatment.

7. The device according to claim 1, wherein the number of capillary channels in the at least one first capillary element is at least 3.

8. The device according to claim 1, wherein at least a portion of the inner surface of the plurality of capillary channels comprises a hydrophobic treatment.

9. The device according to claim 1, wherein the first mixing chamber further comprises at least one intermediate channel connected in fluid communication between the first mixing chamber and the at least one first capillary element.

10. The device according to claim 9, comprising two first capillary elements and two intermediate channels wherein the first end of each first capillary element is connected in fluid communication with each intermediate channel, and the number of capillary channels in each first capillary element being four.

11. The device according to claim 1, wherein the second end of the at least one first capillary element is an opened truncated cone end.

12. The device according to claim 1, wherein the ratio between the cross section of the first end of the at least one capillary element and the cross section of the second end of the at least one capillary element is between 5 and 20.

13. A microfluidics system, the system comprising:
an anti-clogging multichannel device according to claim 1, and
a mixing device comprising:
  a) a second mixing chamber comprising a first and a second end, and
  b) at least one second capillary element with a first and a second end, wherein the at least one second capillary element comprises an increase of section along its longitudinal axis between the first end of the at least one second capillary element and the second end of the at least one second capillary element,
wherein the second end of the at least one first capillary element is connected in fluid communication with the first end of the at least one second capillary element through the second mixing chamber, and
wherein the second mixing chamber is configured:
to house at least a third solution,
to house the second end of the at least one first capillary element and the first end of the at least one second capillary element, and
to receive the mixture resulting from mixing the first solution and the at least second solution through the second end of the at least one first capillary element.

14. The system according to claim 13, wherein the first end of the at least one second capillary element is an opened truncated cone end.

15. The system according to claim 13, wherein at least a portion of the inner surface of the at least one second capillary element comprises a hydrophilic treatment.

16. A method of production of multiple emulsions comprising the following steps:
  a) providing a microfluidics system according to claim 13;
  b) injecting a first solution through the at least one inlet;
  c) mixing the first solution with at least a second solution in the first mixing chamber;
  d) letting the mixture resulting from step (c) from the first mixing chamber flow to the second mixing chamber through the at least one first capillary element;
  e) mixing the mixture resulting from step (d) with at least a third solution in the second mixing chamber to produce multiple emulsions; and
  f) outputting the multiple emulsions resulting from step (e) through the second end of the at least one second capillary element.

17. The method according to claim 16, wherein the first solution is an aqueous solution.

18. The method according to claim 16, wherein the at least second solution is a polymer solution.

19. The method according to claim 16, wherein the at least third solution is an aqueous solution.

* * * * *